US006828006B2

(12) United States Patent
Takada et al.

(10) Patent No.: US 6,828,006 B2
(45) Date of Patent: Dec. 7, 2004

(54) CELLULOSE ESTER FILM, PROTECTIVE FILM FOR A POLARIZING PLATE OF LIQUID CRYSTAL DISPLAY AND PRODUCTION METHOD OF CELLULOSE ESTER FILM

(75) Inventors: Masahito Takada, Tokyo (JP); Isamu Michihata, Tokyo (JP); Kouichi Saito, Tokyo (JP); Hiroko Yokouchi, Tokyo (JP); Noriki Tachibana, Tokyo (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 10/671,083

(22) Filed: Sep. 25, 2003

(65) Prior Publication Data

US 2004/0058180 A1 Mar. 25, 2004

Related U.S. Application Data

(63) Continuation of application No. 09/688,506, filed on Oct. 16, 2000, now Pat. No. 6,652,926.

(30) Foreign Application Priority Data

Oct. 21, 1999 (JP) ........................................ 1999-300165

(51) Int. Cl.$^7$ .............................. B32B 5/16; B32B 5/14; C09K 19/00
(52) U.S. Cl. ........................ 428/143; 428/215; 428/147; 428/148; 428/149; 428/323; 428/325; 428/327; 428/328; 428/329; 428/331; 428/532; 428/1.3; 428/1.1; 349/96
(58) Field of Search ................................. 428/215, 143, 428/147, 148, 149, 323, 325, 327, 328, 329, 331, 532, 1.3, 1.1; 349/96

(56) References Cited

U.S. PATENT DOCUMENTS

| 5,773,126 A | * | 6/1998 | Noritake et al. ............ 428/143 |
| 5,806,834 A | | 9/1998 | Yoshida |
| 5,914,073 A | | 6/1999 | Kobayashi et al. |
| 6,001,277 A | | 12/1999 | Ichimura et al. |
| 6,033,743 A | * | 3/2000 | Suzuki et al. .............. 428/1.31 |
| 6,124,042 A | | 9/2000 | Hashimoto |
| 6,261,665 B1 | * | 7/2001 | Murata et al. .............. 428/143 |
| 2003/0096093 A1 | * | 5/2003 | Sakamaki ................... 428/220 |
| 2003/0148134 A1 | * | 8/2003 | Ono et al. .................. 428/534 |

FOREIGN PATENT DOCUMENTS

JP          2001-72799          3/2001

* cited by examiner

Primary Examiner—William P. Watkins, III
(74) Attorney, Agent, or Firm—Frishauf, Holtz, Goodman & Chick, P.C.

(57) ABSTRACT

A film for a liquid crystal display. The film is a cellulose ester film with a thickness between 20 and 65 μm and containing fine particles. The average diameter of fine particles is 0.05 to 3.0 μm. The number of fine particles per 1,000 μm$^2$ is 5 to 500 in the cross-section perpendicular to the cellulose ester film in a region of a depth of not more than 10 μm.

22 Claims, 1 Drawing Sheet

CELLULOSE ESTER FILM, PROTECTIVE FILM FOR A POLARIZING PLATE OF LIQUID CRYSTAL DISPLAY AND PRODUCTION METHOD OF CELLULOSE ESTER FILM

This is a Continuation Application of application Ser. No. 09/688,506 filed Oct. 16, 2000 (now U.S. Pat. No. 6,652,926 issued Nov. 25. 2003).

FIELD OF THE INVENTION

The present invention relates to a film such as a protective film for a polarizing plate, an optically anisotropic film, and the like, which is employed for a liquid crystal display, and a polarizing plate and a liquid crystal display.

BACKGROUND OF THE INVENTION

In recent years, along with use of liquid crystal displays (LCD) in various types of equipment, a decrease in their thickness as well as a decrease in their weight has been demanded. Accordingly, a decrease in thickness as well as a decrease in weight is also demanded for polarizing plates employed in such LCD.

Further, along with a decrease in film thickness, problems have occurred in which, when liquid crystal displays are constructed, display unevenness tends to occur. As the results of the inventors' investigation, it was discovered that said display unevenness is caused due to blocking, that is, films adhere to each other and the like. With a decrease in film thickness, said blocking is more likely to occur. As a result, non-uniformity of the film surface is caused due to coat mottling, crease wrinkling, and the like. Thus, said surface non-uniformity causes the display unevenness. When the wrinkling is found during transportation of the film, film breaking etc. may be caused and serious accident such as stopping production line may be induced. Such accidents become remarkable in accordance that thickness of the film becomes small as 20 to 65 $\mu$m. Accordingly, in the film employed in liquid crystal displays, surface uniformity is a more essential requirement characteristic compared to films which are employed for the other purposes. The present invention relates to the enhancement of said surface uniformity of the film for liquid crystal displays.

At present, cellulose triacetate (TAC) is primarily employed as the protective film for such polarizing plate, and it is relatively thick, at least 80 $\mu$m. Since four sheets of said protective film are commonly employed per plate, a decrease in its thickness is highly demanded.

However, when the thickness of TAC film, which is employed as the protective film, is decreased, during production of said TAC film as well as during the following production process of polarizing plates, problems occur such as, for example, formation of wrinkles during conveyance in the casting process, degradation of film flatness during its wound state, and the like. Thus a decrease in thickness has not been easy.

SUMMARY OF THE INVENTION

A technical object of the present invention is to obtain a cellulose ester film which exhibits excellence in handling during the film casting process as well as during the polarizing plate preparation process, when the thickness of said protective film for a polarizing plate is decreased in accordance with a decrease in thickness of liquid crystal display elements, and a production method of the same.

The invention and its embodiment are described.

(1) A film for a liquid crystal display comprising cellulose ester film and fine particles, wherein average diameter of fine particles is 0.005 to 3.0 $\mu$m, number of the fine particles per 1,000 $\mu$m$^2$ is 0 to 500 in the cross-section perpendicular to the cellulose ester film in the region of a depth of not more than 10 $\mu$m, and thickness of said cellulose ester film is between 20 and 65 $\mu$m.

(2) The film for a liquid crystal display of (1), wherein an amount of the fine particles in said film is 0.04 to 0.3 percent by weight with respect to cellulose ester.

(3) The film for a liquid crystal display of (1), wherein the cellulose ester film further comprises fine particles having average particle diameter of 3 to 10 $\mu$m.

(4) The film for a liquid crystal display of (1), wherein haze of the cellulose ester film is 0.0 to 0.6 percent, and dynamic friction coefficient between the front surface and the back surface of said film is 0.5 to 1.3.

(5) The film for a liquid crystal display of (1), wherein the fine particles comprise a compound containing silicon atom.

(6) The film for a liquid crystal display of (1), wherein said cellulose ester film is subjected to knurling treatment of both edges so that the relationship of X (in percent)=(a/d)×100 is maintained, X is to be between 0.0 and 25.0 percent, wherein "a" (in $\mu$m) is the height of said knurling and "d" (in $\mu$m) is the thickness of said film.

(7) The film for a liquid crystal display of (1), wherein the film is a protective layer of polarizing plate.

(8) The film for a liquid crystal display of (1), wherein A/B is 1 or more, wherein A is a number of fine particles per 1000 $\mu$m$^2$ in the region having a thickness of 10 percent of the thickness from the surface of a cellulose ester film, and B is a number of fine particles per 1000 $\mu$m$^2$ in the region having a remaining thickness of 80 percent of said thickness.

(9) The film for a liquid crystal display of (1), wherein number of the fine particles per 1,000 $\mu$m$^2$ is 0 to 5 in the cross-section perpendicular to the cellulose ester film in the region of a depth of 10 $\mu$m or more (10) The film for a liquid crystal display of (1), wherein number of projections having a size of at least 0.1 $\mu$m, which exist on the surface of the cellulose ester film, is between 10 and 500 per 0.1 m$^2$.

(11) The film for a liquid crystal display of (1), wherein true specific gravity of the fine particles is between 0.8 and 4.0.

(12) A polarizing plate comprising a first protective film for the polarizing plate, a polarizing element, and a second protective film for the polarizing plate, wherein at least one of the first protective film and the second protective film comprises cellulose ester film and fine particles, wherein average diameter of fine particles is 0.005 to 3.0 $\mu$m, number of the fine particles per 1,000 $\mu$m$^2$ is 0 to 500 in the cross-section perpendicular to the cellulose ester film in the region of a depth of not more than 10 $\mu$m, and thickness of said cellulose ester film is between 20 and 65 $\mu$m.

(13) A liquid crystal display comprising first polarizing plate, a liquid crystal cell, and a second polarizing plate provided at inner portion with respect to the first polarizing plate and the liquid crystal cell, wherein the first polarizing plate has a first polarizing element, a first protective film provided on a surface of the first polarizing element which surface is not faced to the liquid crystal cell, and a second protective film provided on a surface of the first polarizing element which surface is not faced to the liquid crystal cell, the second polarizing plate has a second polarizing element, a third protective film provided on a surface of the second polarizing element which surface is faced to the liquid crystal cell, and a fourth protective film provided on a surface of the second polarizing element which surface is faced to the liquid crystal cell, wherein at least one of the first protective film, the second protective film, the third protective film and the fourth protective film comprises cellulose ester film and fine particles, wherein average diameter of fine particles is 0.005 to 3.0 $\mu$m, number of the fine particles per 1,000 $\mu m^2$ is 0 to 500 in the cross-section perpendicular to the cellulose ester film in the region of a depth of not more than 10 $\mu$m, and thickness of said cellulose ester film is between 20 and 65 $\mu$m.

(14) A preparation method of a film for a liquid crystal display comprising steps of mixing fine particles with a dope prepared by dissolving cellulose ester in a solvent, casting the mixture of fine particles with the dope onto a support, and drying the cast the mixture, wherein average diameter of fine particles is 0.005 to 3.0 $\mu$m, thickness of said cellulose ester film is between 20 and 65 $\mu$m, and the fine particles are mixed with the dope after dispersing by a high pressure homogenizer at pressure of 100 kgf/cm$^2$ or more.

(15) A preparation method of a film for a liquid crystal display comprising steps of mixing fine particles with a dope prepared by dissolving cellulose ester in a solvent, casting the mixture of fine particles with the dope onto a support, and drying the cast the mixture, wherein average diameter of fine particles is 0.005 to 3.0 $\mu$m, thickness of said cellulose ester film is between 20 and 65 $\mu$m, and the fine particles are mixed with the dope after dispersing in a solvent at concentration of 1 to 30 wt %.

The other embodiment of the invention is described.

1. A cellulose ester film which comprises fine particles in said film in an amount of 0.04 to 0.3 percent by weight with respect to cellulose ester.
2. A cellulose ester film which comprises fine particles having an average diameter of 1.0 to 10.0 $\mu$m in said film.
3. A cellulose ester film exhibiting a film haze of 0.0 to 0.6 percent as well as having a dynamic friction coefficient between the front-surface and the back surface of said film of 0.5 to 1.3.
4. The cellulose ester film described in any one of 1., 2., and 3. above, wherein the thickness of said cellulose ester film is between 20 and 65 $\mu$m.
5. The cellulose ester film described in any one of 1. through 4., wherein said fine particles are comprised of a compound containing silicon atoms.
6. The cellulose ester film described in any one of 1. through 5. above, wherein said cellulose ester film is subjected to knurling treatment of both edges so that when the relationship of X (in percent)=(a/d)×100 is maintained, X is to be between 0.0 and 25.0 percent, wherein "a" (in $\mu$m) is the height of said knurling and "d" (in $\mu$m) is the thickness of said film.
7. A protective film for a polarizing plate which is prepared employing the cellulose ester film described in any one of 1. through 6. above.
8. A production method of a cellulose ester film wherein after dispensing fine particles at a pressure of at least 100 kgf/cm$^2$ employing a high pressure homogenizer, the resultant dispersion is blended with a dope prepared by dissolving cellulose ester in a solvent, and the resultant blend is cast onto a support and subsequently dried.
9. A production method of a cellulose ester film wherein after dispensing fine particles in a solvent comprising lower alcohols in an amount of 25 to 100 percent by weight, the resultant dispersion is blended with a dope prepared by dissolving cellulose ester in a solvent, and the resultant blend is cast onto a support and subsequently dried.
10. A production method of a cellulose ester film wherein after dispensing fine particles in a solvent to obtain a concentration of 1 to 30 percent by weight, the resultant dispersion is blended with a dope prepared by dissolving cellulose ester in a solvent, and the resultant blend is cast onto a support and subsequently dried.
11. The production method of a cellulose ester film described in any one of 8., 9., and 10. above wherein the thickness of said cellulose ester film is between 20 and 65 $\mu$.

DETAILED DESCRIPTION OF THE INVENTION

Film for liquid crystal displays is comprised of cellulose ester film, as well as fine particles. The average diameter of said fine particles is commonly between 0.05 and 3.0 $\mu$m, and is preferably between 0.05 and 2.0 $\mu$m. Further, in the region of a depth of 10 $\mu$m from the surface of cellulose ester film, 5 to 500 fine particles, having an average diameter of 0.05 to 3.0 $\mu$m per 1,000 $\mu m^2$, exist in the cross-section of the cellulose ester film. The thickness of said cellulose ester film is commonly between 20 and 65 $\mu$m, is preferably between 30 and 60 $\mu$m, and is more preferably between 35 and 50 $\mu$m.

Further, said average diameter of fine particles means the average length of particles in the longer axis direction at the observed position of a film, when the cellulose ester film is observed employing an electron microscope and also an optical microscope. Particles to be observed are not particularly specified, and they may be primary particles or secondary particles which are comprised of coagulated primary particles. However, particles, which are commonly observed, are mostly secondary particles.

One example of measurement methods is as follows. An area of 9,775 mm$^2$ of a film is observed employing a microscope, and the average of the particle diameter at the observed position is obtained. In the same film, the same measurement is carried out at 10 randomly selected positions and each average is obtained. The average diameter is then obtained by averaging particle diameters at 10 positions.

Further, the number of fine particles in the region of a depth of 10 μm from the surface of the cellulose ester film may be determined as follows. For example, topographic pictures at 10 randomly selected positions per sample film are produced and in each picture, the number of particles in an area of 1000 μm² within a depth of 10 μm is determined. The average diameter of 10 positions is then calculated.

The content of said fine particles, with respect to the cellulose ester of a cellulose ester film, is preferably between 0.04 and 0.3 percent by weight is more preferably between 0.05 and 0.2 percent by weight, and is further more preferably between 0.05 and 0.15 percent by weight. Further, said fine particles are preferably comprised of compounds containing silicon atoms. Materials of said fine particles will be detailed below. Still further, the true specific gravity of said fine particles is preferably between 0.8 and 4.0, is more preferably between 0.8 and 2.5, and is further more preferably between 0.8 and 2.0.

Cellulose ester film may further comprise fine particles having an average particle diameter of 3 to 10 μm, preferably 3 to 5 μm in addition to the aforementioned fine particles.

The haze of said cellulose ester film is preferably between 0 and 0.6 percent. Further, the dynamic friction coefficient of both surfaces of said cellulose ester film is preferably between 0.5 and 1.3, and is more preferably between 0.56 and 1.3. Incidentally, said haze, as well as said dynamic friction coefficient, will be described later.

The both extreme ends in the width direction of said cellulose ester film are preferably subjected to knurling treatment. Further, in the formula of $X=(a/d)\times 100$, X is preferably between 0 and 25 percent, wherein X (in percent) is a ratio; "a" (in μm) is the height of knurling and "d" (in μm) is the film thickness. Said knurling treatment will also be detailed later.

Listed as film for liquid crystal displays of the present invention may be optical compensation film such as a protective film for a polarizing plate, a phase difference film, a glare shielding film, a non-reflective film, and the like. The present invention may suitably be applied to the protective film for a polarizing plate.

A/B is preferably 1 or more, wherein A is the number of fine particles per 1000 μm² in the region having a thickness of 10 percent of the thickness from the surface of a cellulose ester film, and B is the number of fine particles per 1000 μm² in the region having a remaining thickness of 80 percent of said thickness. A/B is more preferably between 1 and 10. Further, 5 to 500 fine particles per 1000 μm² may be present in the region of a depth of 10 μm or more. However, in the region of a depth of 10 μm or more, 0 to 5 fine particles per 1,000 μm² are preferably present in the cross-section perpendicular to the cellulose ester film. The number of inner particles, which barely contribute to minimize blocking, is preferably decreased because it is possible to thereby decrease the haze.

The number of projections having a size of at least 0.1 μm, which exist on the surface of the cellulose ester film, is preferably between 10 and 500 per 1000 μm². The number and size of said projections can be determined employing an optical interference type surface roughness meter such as WYKO and the like.

Listed as cellulose esters according to the present invention are cellulose triacetate, cellulose diacetate, cellulose acetate butyrate, cellulose acetate propionate, and the like. Cellulose triacetate is particularly preferred which has a degree of polymerization of 250 to 400 and a ratio of bonded acetic acid of 54.0 to 62.5 percent. Cellulose triacetate, having a ratio of bonded acetic acid of 58.0 to 62.5 percent, is more preferred due to its higher base strength.

Cellulose triacetate, which is synthesized employing cotton linters and one, which is synthesized employing wood pulp, may be employed individually or in combination.

Said cellulose triacetate, which is synthesized employing cotton linters, exhibits better peeling properties when it is peeled from a belt or drum. Thus its higher content ratio is preferred because higher production efficiency is achieved. When the content ratio of said cellulose triacetate, which is synthesized employing cotton linters, is at least 60 percent by weight, peeling properties are markedly improved. Accordingly, said content ratio is preferably at least 60 percent by weight, is more preferably at least 85 percent by weight, and is further more preferably 100 percent by weight.

In the present invention, it is possible to employ plasticizers. Preferably employed individually or in combination are, for example, phosphoric acid ester based compounds such as triphenyl phosphate, tricresyl phosphate, cresyl diphenyl phosphate, octyl diphenyl phosphate, diphenyl biphenyl phosphate, trioctyl phosphate, tributyl phosphate, and the like; phthalic acid ester based compounds such as diethyl phthalate, dimethoxyethyl phthalate, dimethyl phthalate, dioctyl phthalate, dibutyl phthalate, di-2-ethyl hexyl phthalate, etc.; and glycolic acid ester based compounds such as triacetin, tributyrin, butyl phthalyl butyl glycolate, ethyl phthalyl ethyl glycolate, methyl phthalyl ethyl glycolate, butyl phthalyl butyl glycolate, and the like.

If desired, two or more types of plasticizers may be employed in combination. In this case, when any of several phosphoric acid ester based plasticizers is employed along with other plasticizers, the employed ratio is preferably no more than 50 percent because the resultant cellulose ester film undergoes minimal hydrolysis and exhibits excellent durability.

The lower the content ratio of phosphoric acid ester based plasticizers is, the more preferred it is. Particularly preferable is that either phthalic acid based or glycolic acid based plasticizers are only employed.

Further, in the present invention, in order to regulate a water absorption coefficient as well as a moisture percentage in the specified range, the added amount of plasticizers is preferably between 3 and 30 percent by weight with respect to the cellulose ester, is more preferably between 10 and 25 percent by weight, and is further more preferably between 15 and 25 percent by weight. When said amount is at least 30 percent by weight, mechanical strength, as well as dimensional stability is degraded.

UV absorbers are preferably incorporated into the cellulose ester film of the present invention. Said UV absorbers preferably employed are those which exhibit excellent absorbing power of ultraviolet rays of wavelengths no more than 370 nm from the viewpoint of minimizing of degradation of liquid crystals, and which minimally absorbs visible light of wavelengths of at least 400 nm from the viewpoint of excellent displaying properties of liquid crystals.

In the present invention, transmittance at a wavelength of 370 nm is required to be no more than 10 percent, is preferably no more than 5 percent, and is more preferably no more than 2 percent.

Commonly employed UV absorbers include, for example, oxybenzophenone based compounds, benzotriazole based compounds, salicylic acid ester based compounds, benzophenone based compounds, cyanoacrylate based compounds, nickel complex salt based compounds, and the like. However, the present invention is not limited to only these compounds.

In the present invention, one or more types of these UV absorbers are preferably employed, and two or more types of different UV absorbers may also be incorporated.

UV absorbers, which are preferably employed in the present invention, include benzotriazole based UV absorbers, benzophenone based UV absorbers, and the like. An embodiment is particularly preferred in which benzotriazole based UV absorbers, which have less unnecessary tint, are incorporated into the cellulose ester film.

UV absorbers are dissolved in organic solvents such as alcohol, methylene chloride, dioxolan, and the like and then added to a dope. Alternatively, said UV absorbers may be added directly to a dope composition. Compounds such as inorganic powders, which are insoluble in organic solvents, are dispersed into a mixture consisting of organic solvents and cellulose ester, employing a dissolver or a sand mill, and subsequently added to a dope.

The employed amount of UV absorbers in the present invention is commonly between 0.1 and 2.5 percent by weight with respect to the cellulose ester, is preferably between 0.5 and 2.0 percent by weight, and is further more preferably between 0.8 and 2.0 percent by weight. It is not preferable that the employed amount exceeds 2.5 percent by weight, because film transparency tends to be degraded.

Employed as solvents for cellulose esters in accordance with the present invention may be, for example, lower alcohols such as methanol, ethanol, n-propyl alcohol, isopropyl alcohol, n-butanol, and the like, as well as cyclohexanedioxanes, lower aliphatic hydrocarbon chlorides and the like.

The ratio of solvents is such that, for example, 70 to 95 percent by weight of methylene chloride and 30 to 5 percent by weight of other solvents are preferred. Further, the concentration of cellulose ester is preferably between 10 and 50 percent by weight. The heating temperature range after the addition of solvents is preferably higher than the boiling point of added solvents and the temperature range is also preferred in which said solvents do not boil. For example, the temperature is suitably set at 60° C. or higher, or preferably between 80 and 110° C. Further, the pressure is regulated so that solvents do not boil at the set temperature.

After dissolution, dissolved cellulose ester may be removed from the vessel while being cooled. Alternatively, it may be removed from the vessel employing a pump, cooled employing a heat exchanger, and subsequently made available for casting.

Production methods of cellulose ester in the present invention are not particularly limited, and those which are generally known in this industry, may be employed. It is possible to refer to methods described in, for example, U.S. Pat. Nos. 2,492,978, 2,739,070, 2,739,069, 2,492,977, 2,336,310, 2,367,603, and 2,607,704; British Patent Nos. 64,071, and 735,892; Japanese Patent Publication Nos. 45-9074, 49-4554, 49-5614, 60-27562, 61-39890, 62-4208, and others.

In addition to cellulose ester and solvents, necessary additives such as plasticizers, UV absorbers, and the like, may be previously blended with solvents, subjected to dissolution or dispersion and then placed in solvents in which cellulose ester is not yet dissolved or in a dope in which cellulose ester is already dissolved.

Pressure vessels are not particularly limited. They may be employed only if they are capable of resisting specified pressure and have means of being heated as well as stirred under increased pressure. Said pressure vessel may also be appropriately equipped with measuring instruments such manometers, thermometers and the like.

An increase in pressure may be carried out employing a method in which inert gases, such as nitrogen and the like, are introduced under pressure, or alternately, the vapor pressure of the solvent is increased by heating.

Heating is preferably carried out supplying exterior heat. For example, a jacket type heating device is preferred due to the ease of temperature control.

Heating temperature after the addition of solvents is preferably higher than the boiling point of the employed solvent and in the temperature range in which said solvent does not boil. For example, the temperature is suitably set in the range of 80 to 110° C. Further, the pressure is adjusted so that said solvent does not boil at the set temperature.

After dissolution, the dope is directly removed from the vessel while being cooled, or removed from the vessel employing a pump and the like, cooled employing a heat exchanger and the like, and made available for casting. During said process, the dope may be cooled to normal temperature. However, it is preferable that the dope is cooled to a temperature which is 5 to 10° C. lower than the boiling point of the employed solvent, and casting is carried out without varying the temperature, because it is possible to decrease the viscosity of said dope.

In the present invention, after a dope, which is obtained by dissolving cellulose ester, is cast onto a support (a casting process), said cast dope is heated to evaporate some of the incorporated solvents (a drying process on the support). Thereafter, the resulting film is peeled from the support, and said peeled film is dried (a film drying process). Thus a cellulose ester film is obtained.

Employed as supports in the casting process are stainless steel endless belt or drum supports with the surface which is subjected to mirror grinding. Casting may be carried out onto the support having a temperature in the common range of 0° C. to the boiling point of the employed solvent. However, said casting is preferably carried out on the support maintained at a temperature of 5 to 30° C., because a peeling limited time is enhanced due to the gel formation of the dope. Said casting is more preferably carried out on the support maintained at a temperature of 5 to 15° C. The peeling limited time as described herein means the time for which the cast dope remains on the support at the upper limit of the casting rate at which a transparent film exhibiting the desired flatness is continually obtained. A short peeling limited time is preferred due to the resultant increase in productivity.

In the drying process on the support, a dope is cast and temporarily allowed to gel. When the time from casting to peeling is expressed as 100 percent, the dope temperature is preferably raised to the range of 40 to 70° C. within 30 percent from the start of casting so that accelerated evaporation of solvents makes it possible to carry out earlier peeling from the support and to increase the peeling strength, however the dope temperature is more preferably raised to the range of 55 to 70° C. within said 30 percent. The resulting temperature is preferably maintained for at least the following 20 percent, and is more preferably maintained for at least the following 40 percent.

During drying of said dope on said support, peeling from said support is preferably carried out at a residual solvent amount of 60 to 150 percent due to a decrease of peeling resistance from said support, and is more preferably carried out at a residual solvent amount of 80 to 120 percent. Said dope temperature, when peeled, is preferably between 0 and 30° C. to increase the base strength during peeling, as well as to prevent breakage of the base during peeling, and is more preferably between 5 and 20° C.

The residual solvent amount in a film is expressed employing the following formula:

Residual solvent amount (in percent)=(weight of remaining volatile component/film weight after heating treatment×100, wherein the weight of remaining volatile components is obtained by subtracting the film weight after heat treatment from the film weight prior to said heat treatment.

During the film drying process, the film peeled from the support is further dried. In order to obtain a film having excellent dimensional stability, the residual solvent content is commonly no more than 3 percent by weight, is preferably no more than one percent by weight, and is further more preferably no more than 0.5 percent by weight. In the film drying process, generally employed drying methods include a roll loft drying method, a pin tenter method, or a clip tenter method in which a film is dried while being conveyed. In order to enhance dimensional stability, the member for liquid crystal displays is preferably dried while maintaining the width, employing the tenter method. Maintaining the width soon after peeling, when the residual solvent amount is relatively great, is particularly preferred so that effects to enhance the dimensional stability are further exhibited. During the drying process after peeling from the support, the film tends to shrink in the width direction due to solvent evaporation.

When drying is carried out at higher temperature, said shrinkage increases further. Drying is preferably carried out while minimizing the resulting shrinkage in order to improve the flatness of the produced film. From this viewpoint, a method/a tenter method is preferred in which, as shown in, for example, Japanese Patent Publication Open to Public Inspection No. 62-46625, the entire or a part of the drying process is carried out while temporarily securing both edges of the web.

Means to dry the film are not particularly limited, and drying is generally carried out employing hot air flow, infrared rays, heated rollers, microwaves, and the like. Drying is preferably carried out employing the hot air flow due to its inherent simplicity. Drying is preferably carried out in such a manner that the range of drying temperature of 40 to 150° C. is divided into 3 to 5 sections in which said drying temperature is incrementally raised. Further, drying is more preferably carried out in the range of 80 to 140° C., because the dimensional stability is thereby improved.

These processes, from casting to post-drying, may be carried out in an ambience comprised of either air or inert gases such as nitrogen gas and the like.

It is natural that the concentration of solvents in the drying ambience be controlled while taking into account their explosion limits.

Employed as winders involved in the production of cellulose ester film of the present invention may be those which are commonly used. Said winding may be carried out employing methods such as a constant tension method, a constant torque method, a taper tension method, an inner stress constant program tension control method, and the like.

Further, fine particles are incorporated as the matting agent into the cellulose ester film based on the present invention.

Types of fine particles may include either inorganic compounds or organic compounds. Listed as examples of inorganic compounds are fine particles of silicon dioxide, titanium dioxide, aluminum oxide, zirconium oxide, tin oxide, and the like. Of these, compounds containing silicon atoms are preferred, and fine silicon dioxide particles are particularly preferred. Listed as such fine silicon dioxide particles may be Aerosil 200, 200V, 300, R972, R972V, R974, R202, R812, R805, OX50, TT600, and the like, manufactured by Aerosil Co., Ltd.

Listed as organic compounds are acrylic resins, silicone resins, fluorine compound resins, urethane resins, and the like.

In the present invention, a composition, which is prepared by blending fine particles with solvents, is processed employing a high pressure homogenizer. The high pressure homogenizer employing in the present invention is an apparatus which produces specific conditions such as a high shearing state, a high pressure state, and the like by passing said composition, prepared by blending fine particles with solvents through a thin pipe at a high speed. When processed in said high pressure homogenizer, for example, the maximum pressure in the thin tube, having a tube diameter of 1 to 2,000 μm located in the interior of said homogenizer, is preferably at least 100 kgf/cm$^2$. Said pressure is more preferably 200 kgf/cm$^2$. Further, during dispersion, preferred is a homogenizer which attains a maximum speed of at least 100 m/second, as well as a maximum rate of heat transfer of 100 kcal/hour.

High pressure homogenizers as described above include ultra-high pressure homogenizers under the trade name of Microfluidizer, manufactured by Microfluidics Corporation and Nanomizer, manufactured by Nanomizer Co. In addition to these, listed are Manton-Gaulin type high pressure homogenizers such as, for example, homogenizers manufactured by Izumi Food Machinery, and the like.

In the present invention, a cellulose ester film is obtained in such a manner that after dispersing fine particles into a solvent comprising lower alcohols in an amount of 25 to 100 percent by weight, the resultant dispersion is blended with a dope prepared by dissolving cellulose ester in solvents, and the resultant blend is cast onto a support and subsequently dried. The content ratio of said lower alcohols is preferably between 50 and 100 percent by weight, and is more preferably between 75 and 100 percent by weigh. Lower alcohols preferably include methyl alcohol, ethyl alcohol, propyl alcohol, isopropyl alcohol, butyl alcohol, and the like.

Solvents other than said lower alcohols are not specifically limited. However, it is preferred to employ solvents which are used during casting of the cellulose ester.

In the present invention, fine particles are dispersed in a solvent at a concentration of 1 to 30 percent by weight. It is not preferred that dispersion be carried out at a concentration higher than the upper limit, because the resultant viscosity rapidly rises. The concentration of fine particles in the dispersion is preferably between 5 and 25 percent by weight, and is more preferably between 10 and 20 percent by weight.

In the present invention, it is possible to measure the haze of a film in accordance with, for example, ASTM-D1003-52. In the present invention, the haze is preferably between 0.0 and 0.6 percent, is more preferably between 0.0 and 0.4 percent, and is further more preferably between 0.1 and 0.2 percent.

In the present invention, it is possible to measure the dynamic friction coefficients of the front surface of the film as well as its back surface, employing a method specified in, for example, JIS-K-7125 (1987). In this case, however, in the course of the measurement of the dynamic friction coefficient of a film, it is impossible to confirm the effects due to the addition of fine particles to the film, when metal such as a steel ball and the like is used as another contact material. It is essential to measure the mutual dynamic friction coefficient of films. Thus, said measurements can be carried out in such a manner that in accordance with said JIS-K-7125, films are employed as a test piece as well as another contact material, and arrangement is carried out so that the front surface of one piece of film is brought into contact with the back surface of another piece of film. In the present invention, said dynamic friction coefficient is preferably between 0.5 and 1.3, is more preferably between 0.5 and 1.0, and is further more preferably between 0.6 and 0.8.

In the present invention, a cellulose ester film is subjected to so-called knurling treatment at both edges, which increases the bulk height at both edges by providing a concave and convex embossing.

When the following formula holds, it is characterized that X (in percent) is between 0 and 25:

$$X(\text{in percent}) = (a/d) \times 100$$

wherein "a" (in $\mu$m) is the height of said knurling and "d" (in $\mu$m) is the thickness of the film. X is preferably between 0 and 15 percent, and is more preferably between 0 and 10 percent. When the ratio of the height of said knurling is more than the upper limit, the wound film shape tends to deform. On the contrary, it is not preferable that said ratio be too small, because winding properties are degraded.

In the present invention, a cellulose ester film preferably comprises minimal foreign matter particles. Specifically, it is preferable that foreign matter particles are minimal which are detected at a polarized light cross Nicol state.

The foreign matter particles observed at the polarized light cross Nicol state as described herein refer to those which are measured when two polarized plates are arranged at a right angle to each other (cross Nicol state) and a cellulose film is placed between them. When such foreign matter particles in the polarized light cross Nicol state are observed in a dark visual field, only foreign matter particles gleam. Thus, it is possible to measure their size as well as their number.

It is preferable that the number of foreign matter particles at a size of 5 to 50 $\mu$, observed in the polarized light cross Nicol state, is no more than 200 per 250 mm$^2$, and the number of foreign particles having a size of at least 50$\mu$ is substantially zero. Further, the number of foreign matter particles having a size of 5 to 50$\mu$ is preferably no more than 100, and is more preferably no more than 50.

Methods to obtain said cellulose ester film comprising minimal foreign matter particles are not particularly limited. However, by employing the filter paper described below, it is possible to obtain desired cellulose ester film by filtering a dope composition prepared by dissolving cellulose ester in solvents. In this case, said dope composition is preferably filtered at a filtration pressure of no more than 16/kg.cm$^2$, employing a filter paper having a water filtration time of at least 20 seconds, and the resultant dope composition is then cast. Said dope composition is more preferably filtered at a filtration pressure of no moire than 12 kg/cm$^2$, employing a filter paper having a water filtration time of at least 30 seconds, and is further more preferably filtered at a filtration pressure of no more than 10 kg/cm$^2$, employing a filter paper having a water filtration time of at least 40 seconds. Further, at least two sheets of filter paper, which are stacked, are preferably employed. Still further, it is possible to control the filtration pressure by suitably selecting the filtration flow rate as well as the filtration surface area.

Preparation methods of the polarizing plate according to the present invention are not specifically limited, and the preparation can be carried out employing any of the several common methods. For example, there is a method in which both surfaces of a polarizing film, which is prepared through an alkali treatment, immersion in an iodine solution and stretching, are adhered with a cellulose triester film employing an aqueous solution of completely saponified type polyvinyl alcohol as the adhesive. Instead of said alkali treatment, employed also may be adhesion enhancing methods as described in Japanese Patent Publication Open to Public Inspection Nos. 6-94915 and 6-118232.

Members of liquid crystal displays as described herein are those which are employed in liquid crystal display devices, and include, for example, polarizing plates, protective films for a polarizing plate, phase difference plates, viewing angle enhancing films, glare shielding films, non-reflection films, antistatic films, and the like.

Of these, the present invention is more preferably applied to polarizing plates, protective films for a polarizing plate, phase difference plates, and viewing angle enhancing films, which are subjected to stringent demand for dimensional stability.

Further, the polarizing plate of the present invention is one which is sandwiched between a first protective film for said polarizing plate and a second protective film for the same. In addition, at least one of the protective films for said polarizing plate and the second protective film for the same is employed as a film for the liquid crystal display of the present invention. Further, both of the first protective film for said polarizing plate and the second protective film for the same are preferably employed as films for the liquid crystal display of the present invention.

Further, the liquid crystal display of the present invention comprises a first polarizing plate, a liquid crystal cell, and a second polarizing plate which is provided on the inner side of the first polarizing plate as well as the liquid crystal cell. Still further, the first polarizing plate comprises a first polarizer, a first protective film for the polarizing plate provided on the surface of the first polarizer on the side which does not face the liquid crystal cell, and a second protective film for the polarizing plate provided on the surface of the first polarizer on the side which faces the liquid crystal cell. The second polarizing plate comprises a second polarizer, a third protective film for the polarizing plate provided on the surface of the second polarizer on the side which faces the liquid crystal cell, and a fourth protective film for the polarizing plate provided on the surface of the second polarizer on the side which does not face the liquid crystal cell.

Further, at least one of the first protective film for the polarizing plate, the second protective film for the same, the third protective film for the same, and the fourth protective film for the same is employed as the film for the liquid crystal display of the present invention.

Still further, in the present liquid crystal display, all of the first protective film for the polarizing plate through the fourth protective film for the same are employed as films for the liquid crystal display of the present invention.

Listed as liquid crystal displays are vertical alignment (VA) type liquid crystal displays, and twist nematic (TN) type liquid displays such as STN, TN, and the like. Of course, TFT type liquid crystal displays can also be employed.

Figure 1:
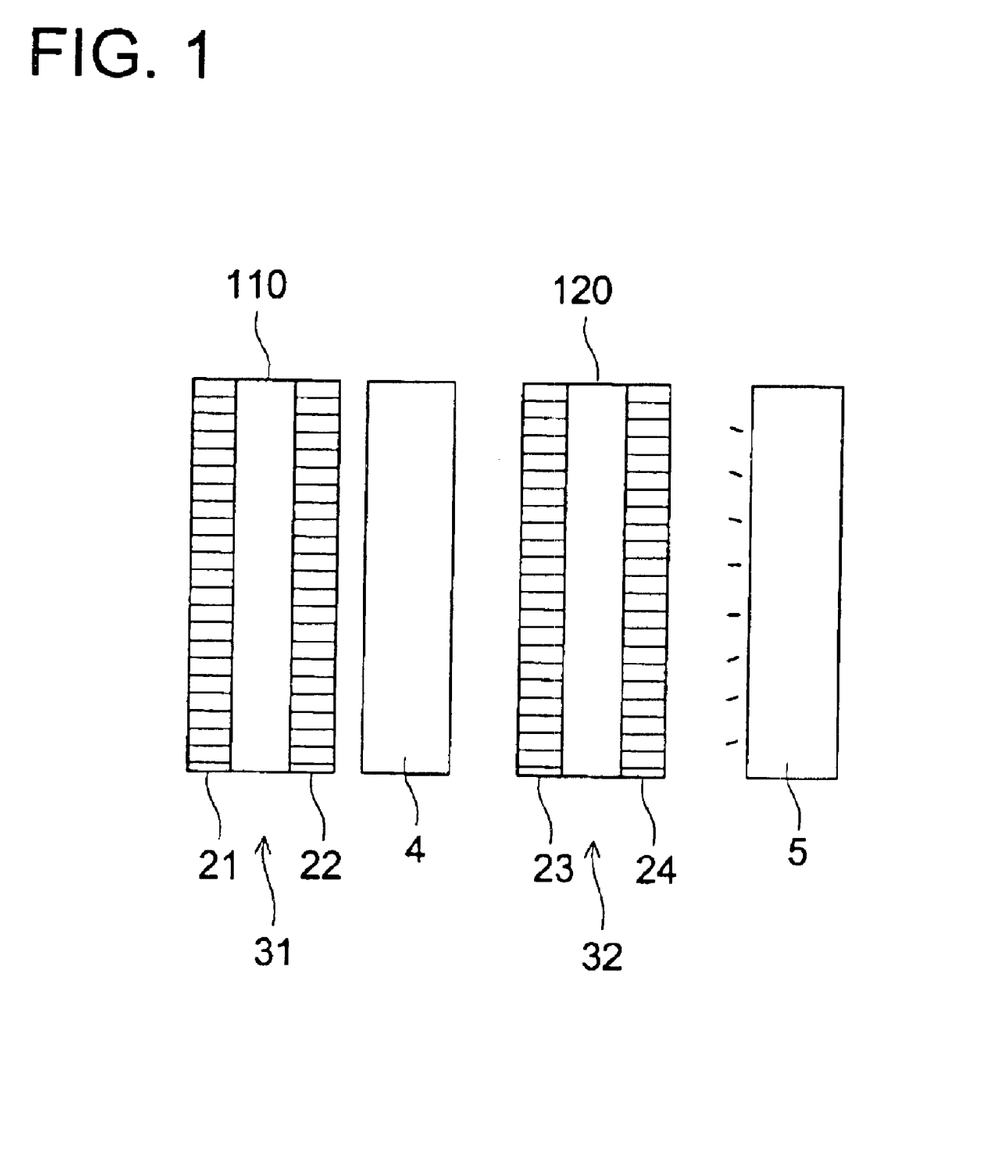
FIG. 1 shows a schematic view of one example of a liquid crystal display.

FIG. 1 shows a schematic view of one example of a liquid crystal display. Numeral 5 is a light source, and numeral 4 is a liquid crystal cell. Numeral 31 is a first polarizing plate, while numeral 32 is a second polarizing plate. First polarizing plate 31 comprises fist protective film 21 for the polarizing plate, second protective film 22 for the polarizing plate, and first polarizer 110. Second polarizing plate 32 comprises third protective film 23 for the polarizing plate, fourth protective film 24 for the polarizing plate, and second polarizer 120. In this example, the first protective film for the polarizing plate through the fourth protective film for the same, are employed as films for the liquid crystal display of the present invention. The liquid crystal display of the present invention is not naturally limited to said embodiment.

EXAMPLES

The present invention will now be specifically described with reference to the examples below.

Example 1

<Preparation of Sample 1>

(Preparation of Dispersion A)

| | |
|---|---|
| Ethanol | 27 weight parts |
| Fine particles I/fine silicon dioxide particles (under the trade name of Aerosil 200 V, having a primary particle diameter of 12 nm, manufactured by Nihon Aerosil Co., Ltd.) | 3 weight parts | were blended and stirred at 500 rpm for 30 minutes. Thereafter, the resultant mixture was dispersed at a pressure of 250 kgf/cm$^2$, employing a Manton-Gaulin type high pressure homogenizer. Thus Dispersion A was prepared.

(Preparation of Addition Composition A)

| | |
|---|---|
| Dispersion A | 22 weight parts |
| Cellulose triacetate synthesized employing cotton linters | 12 weight parts |
| 2-(2'-hydroxy-3',5'-di-t-butylphenyl)benzotriazole (UV absorber) | 26 weight parts |
| Methylene chloride | 290 weight parts |

The aforementioned addition composition was measured employing a centrifugal type particle distribution measuring apparatus (CAPA500, manufactured by Horiba Seisakusho), and the obtained average particle diameter was 1.2μ.

(Dope Composition A)

| | |
|---|---|
| Cellulose triacetate synthesized employing cotton linters (having a degree of acetyl substitution of 61.0 percent) | 85 weight parts |
| Cellulose triacetate synthesized employing wood pulp (having a degree of acetyl substitution of 61.0 percent) | 15 weight parts |
| Ethyl phthalyl ethyl glycolate (Plasticizer A) | 2 weight parts |
| Triphenyl phosphate (Plasticizer B) | 8 weight parts |
| Methylene chloride | 475 weight parts |
| Ethanol | 50 weight parts |

Dope Composition A was placed in a tightly sealed vessel and was heated to 70° C. A dope was then obtained by completely dissolving cellulose triacetate (TAC), while stirring it. Four hours were allowed for the dissolution. After filtering Dope Composition A, the resultant Dope Composition A and Addition Composition A were blended employing an in-line mixer, resulting in a content ratio of fine particles with respect to the cellulose triacetate of 0.05 percent by weight. Thereafter, the resultant dope at 35° C. was uniformly cast onto a stainless steel band support maintained at 30° C., employing a belt casting apparatus. After drying the cast dope until the range at which it was capable of being peeled, the resultant film was peeled from the stainless steel band support. At that time, the residual solvent amount in said dope was 25 percent. Duration from casting of said dope to peeling was three minutes. After peeling the film from the stainless steel band support, drying was finished through drying zones at 50° C., 90° C., 120° C., and 130° C. while the conveyance was carried out employing numerous rolls. The dried film was then subjected to knurling treatment of its edges to a width of 10 mm and an overall height of 4 μ. Thus Sample 1 of a 40 μm thick triacetate film was prepared. It was regulated that the film width was 1,300 mm and the wound length per roll was 3,000 m. Further, it was regulated that the initial winding tension was 20 kg/1,300 mm and the final winding tension was 10 kg/1,300 mm.

(Preparation of Samples 2 through 7)

Film Samples 2 through 7 were prepared in the same manner as Sample 1, except that the thickness of the cellulose acetate film and the added amount of fine particles, during the preparation of Sample 1, were varied as shown in Table 1.

TABLE 1

| Sample No. | Invention or Comparative | TAC Film Thickness (in μ) | Fine Particles Type | Fine Particles Added Amount (in wt %) | Particle Diameter in Film (in μ) | Haze (in %) |
|---|---|---|---|---|---|---|
| 1 | Invention | 40 | I | 0.05 | 2.5 | 0.1 |
| 2 | Invention | 40 | I | 0.08 | 2.5 | 0.1 |
| 3 | Invention | 40 | I | 0.15 | 2.5 | 0.2 |
| 4 | Invention | 40 | I | 0.25 | 2.5 | 0.3 |
| 5 | Invention | 58 | I | 0.08 | 2.5 | 0.1 |
| 6 | Comparative | 40 | — | 0 | — | 0.1 |
| 7 | Comparative | 58 | — | 0 | — | 0.1 |

| Sample No. | Dynamic Friction Coefficient * | Knurling Height (in μ) | Knurling Ratio (in %) | Convex Problem (number/m$^2$) | Winding Slippage (in mm) |
|---|---|---|---|---|---|
| 1 | 1.0 | 4 | 10 | 1 | 1 |
| 2 | 0.8 | 4 | 10 | 0 | 1 |
| 3 | 0.7 | 4 | 10 | 0 | 1 |
| 4 | 0.6 | 4 | 10 | 0 | 5 |
| 5 | 0.7 | 6 | 10 | 0 | 2 |
| 6 | 2.5 | 4 | 10 | 14 | 3 |
| 7 | 1.9 | 6 | 10 | 10 | 2 |

| Sample No. | Number of fine particles/1000 μm$^2$ | Number of wrinkling |
|---|---|---|
| 1 | 14 | 0 |
| 2 | 91 | 0 |
| 3 | 271 | 0 |
| 4 | 463 | 0 |
| 5 | 17 | 0 |
| 6 | 0 | 5 |
| 7 | 0 | 7 |

* (between the front surface of one piece of film and the back surface of another piece of film)

Samples 1 through 7, prepared as described above, were subjected to performance evaluation as described below.

(Evaluation Methods)

1. Average Particle Diameter

Particles were observed employing a scanning type electron microscope (at a magnification factor of 3,000), and the particle diameter was denoted as the diameter of the circle which circumscribed a particle. Further, 100 particles at arbitrary sites were observed and the average value was designated as the average particle diameter.

2. Haze was measured in accordance with ASTM-D1003-52.

3. Dynamic friction coefficient: The dynamic friction coefficient between the front surface of one piece of film and the back surface of another piece of film was measured in accordance with JIS-K-7125 (1987). Sheets of film were cut so that the front surface of one piece of film was brought into contact with the back surface of another piece of film. Then a 200 g dead weight was placed on said pieces of films, and then the dead weight was pulled horizontally under conditions of a sample moving velocity of 100 mm/minute and a contact area of 80×200 mm. An average load F during movement of the dead weight was measured and the dynamic friction coefficient $\mu$ was obtained employing the formula described below:

Dynamic friction coefficient=F(gf)/weight(gf) of the dead weight

4. Convex press mark problem: In this production process, a 1,500 m roll of film, which was wound, was stored at 23° C. and 55 percent relative humidity for one month. Thereafter, a 1 m long strip of film was cut in the length direction and the number of generated convex deformations was evaluated. A number of no more than 3/m² was evaluated to be commercially viable.
5. Winding slippage: The slippage at the edge of a wound sample was measured. The slippage was preferably no more than 10 mm.
6. Wrinkles: Number of wrinkling during transportation of 1000 m film was observed.

Fine particles II/fine silicon dioxide particles (under the trade name of Aerosil R972V having a primary particle diameter of 12 nm, manufactured by Nihon Aerosil Co., Ltd.) Fine particles III/fine silicon dioxide particles (under the name of Aerosil R972V, having a primary particle diameter of 40 nm manufactured by Nihon Aerosil Co., Ltd.) Fine particles IV/fine silicone resin particles (under the trade name of Tospearl 105, having a primary particle diameter of 0.5 $\mu$, manufactured by Toshiba Silicone Co., LTD.)

Fine particles V/fine PMMA particles (under the trade name of MX-105, having a primary particle diameter of 1.5 $\mu$, manufactured by Soken Kagaku Co., Ltd.)

Fine particles VI/Titanium oxide (under the trade name of Idemitsu Titania IT-OA, having primary paricle diameter of 17 nm, manyfactured by Idemitsu Kosan Co., Ltd.) This was dispersed by means of a sand mill.

TABLE 2

| Sample No. | Invention or Comparative | TAC Film Thickness (in $\mu$) | Fine Particles | | | Particle Diameter in Film (in $\mu$) |
|---|---|---|---|---|---|---|
| | | | Type | Added Amount (in wt %) | Pressure Condition in kgf/cm² | |
| 8 | Comparative | 40 | I | 0.08 | 50 | 15.0 |
| 9 | Invention | 40 | I | 0.08 | 300 | 2.1 |
| 10 | Invention | 40 | I | 0.08 | 400 | 1.8 |
| 11 | Invention | 40 | II | 0.08 | 300 | 2.1 |

| Sample No. | Haze (in %) | Dynamic Friction Coefficient* | Knurling | | Convex Problem (number/m²) | Winding Slippage (in mm) |
|---|---|---|---|---|---|---|
| | | | Height (in $\mu$) | Ratio (in %) | | |
| 8 | 0.8 | 0.4 | 4 | 10 | 5 | 13 |
| 9 | 0.1 | 0.8 | 4 | 10 | 0 | 1 |
| 10 | 0.1 | 0.7 | 4 | 10 | 0 | 1 |
| 11 | 0.1 | 0.8 | 4 | 10 | 0 | 1 |

| Sample No. | Number of fine particles/1000 $\mu$m² | Number of wrinkling |
|---|---|---|
| 8 | 4 | 4 |
| 9 | 85 | 0 |
| 10 | 94 | 0 |
| 11 | 97 | 0 |

*Dynamic Friction Coefficient (between the front surface of one piece of film and the back surface of another piece of film)

7. Number of fine particles: Topographic pictures at 10 randomly selected positions per sample film are produced and in each picture, the number of fine particles in an area of 1000 $\mu$m² within a depth of 10 $\mu$m is determined. The average diameter of 10 positions is then calculated.

As can be seen from Table 1, based on the method of the present invention, problems during winding were minimized by incorporating fine particles into a cellulose ester film. Specifically, as the thickness of said cellulose ester film decreased, desired effects were more markedly exhibited.

Example 2

Samples 8 through 11 were prepared in the same manner as Sample 2, except that in the preparation conditions of Sample 2 of Example 1, the dispersion pressure of the Manton-Gaulin type high pressure homogenizer and the type of fine particles were varied as shown below.

As can be seen from Table 2, based on the present invention, problems during winding were minimized by incorporating fine particles into the cellulose ester film.

Example 3

Samples 12through 16 were prepared in the same manner as Example 1, except that in the conditions of Sample 2 of Example 1, the height of knurling was varied as shown in Table 3.

TABLE 3

| Sample No. | Present Invention or Comparative | TAC Film Thickness (in μ) | Fine Particles | | | Pressure Condition in kgf/cm² | Particle Diameter in Film (in μ) |
|---|---|---|---|---|---|---|---|
| | | | Type | Added Amount (in wt %) | | | |
| 12 | Present Invention | 40 | I | 0.08 | | 2.5 | 0.1 |
| 13 | Present Invention | 40 | I | 0.08 | | 2.5 | 0.1 |
| 14 | Present Invention | 40 | I | 0.08 | | 2.5 | 0.1 |
| 15 | Present Invention | 40 | I | 0.08 | | 2.5 | 0.1 |
| 16 | Present Invention | 40 | I | 0.08 | | 2.5 | 0.1 |

| Sample No. | Haze (in %) | Dynamic Friction Coefficient* | Knurling | | Convex Problem (number/m²) | Winding Slippage (in mm) |
|---|---|---|---|---|---|---|
| | | | Height (in μ) | Ratio (in %) | | |
| 12 | 0.1 | 0.8 | 0 | 0 | 0 | 2 |
| 13 | 0.1 | 0.8 | 3 | 8 | 0 | 1 |
| 14 | 0.1 | 0.8 | 6 | 15 | 0 | 1 |
| 15 | 0.1 | 0.8 | 10 | 25 | 1 | 1 |
| 16 | 0.1 | 0.8 | 12 | 30 | 3 | 0 |

| Sample No. | Number of fine particles/1000 μm² | Number of wrinkling |
|---|---|---|
| 12 | 93 | 0 |
| 13 | 89 | 0 |
| 14 | 90 | 0 |
| 15 | 91 | 0 |
| 16 | 90 | 0 |

*Dynamic Friction Coefficient (between the front surface of one piece of film and the back surface of another piece of film)

As can be seen from Table 3, in the present invention, both the height and the ratio of knurling were more preferably between 0 and 25 percent.

Example 4

Samples 17 through 20, shown in Table 5, were prepared in the same manner as Sample 2 except that in the conditions of Sample 2 of Example 1, the mixing ratio (weight parts/ weight percent) of ethanol to methylene chloride during preparation of fine particle Dispersion A was varied as shown in Table 4.

Further, in the course of the preparation of Sample 2 of Example 1, when Dispersion A was prepared, the concentration of fine particles was varied as shown in Table 4. At that time, Samples 21 through 23, shown in Table 4, were prepared while varying the added amount of the dispersion to the addition composition so that the added amount of fine particles to cellulose triacetate was the same as Sample 2 of Example 1.

Samples 21 through 23 were subjected to evaluation in the same manner as Example 1.

TABLE 4

| Sample No. | Invention or Comparative | TAC Film Thickness (in μ) | Fine Particles | | Dispersion | | |
|---|---|---|---|---|---|---|---|
| | | | | | Ethanol | Methylene Chloride | Concentration |
| | | | Type | Added Amount (in wt %) | weight parts/ weight percent | weight parts/ weight percent | of Fine Particles (wt %) |
| 17 | Invention | 40 | I | 0.08 | 21.6/80 | 5.4/20 | 10 |
| 18 | Invention | 40 | I | 0.08 | 13.5/50 | 13.5/50 | 10 |
| 19 | Comparative | 40 | I | 0.08 | 2.7/10 | 24.3/90 | 10 |
| 20 | Comparative | 40 | I | 0.08 | 0/0 | 27.0/100 | 10 |
| 21 | Invention | 40 | I | 0.08 | 27.0/100 | 0/0 | 15 |
| 22 | Invention | 40 | I | 0.08 | 27.0/100 | 0/0 | 20 |

TABLE 4-continued

| | | | | | | | |
|---|---|---|---|---|---|---|---|
| 23 | Comparative | 40 | I | 0.08 | 27.0/100 | 0/0 | 40 |

| | Particle Diameter in Film (in µm) | Haze (in %) | Dynamic Friction Coefficient* | Convex Problem (number/m²) | Winding Slippage (in mm) |
|---|---|---|---|---|---|
| 17 | 2.5 | 0.1 | 0.8 | 0 | 2 |
| 18 | 2.8 | 0.2 | 0.7 | 0 | 3 |
| 19 | 12.0 | 0.7 | 0.6 | 6 | 11 |
| 20 | 15.0 | 0.8 | 0.6 | 7 | 12 |
| 21 | 2.1 | 0.1 | 0.5 | 0 | 1 |
| 22 | 2.0 | 0.1 | 0.5 | 0 | 1 |
| 23 | 7.2 | 0.8 | 0.5 | 6 | 12 |

| Sample No. | Number of fine particles/1000 µm² | Number of wrinkling |
|---|---|---|
| 17 | 87 | 1 |
| 18 | 81 | 0 |
| 19 | 4 | 4 |
| 20 | 4 | 4 |
| 21 | 99 | 0 |
| 22 | 106 | 0 |
| 23 | 4 | 0 |

*(between the front surface of one piece of film and the back surface of another piece of film)

As can be seen from Table 4, it was found that when fine particle dispersions were prepared in the range of the present invention, winding problems were minimized.

Based on the present invention, it is possible to provide a film for liquid crystal displays, which enables minimized blocking, even though film thickness decreases, and to minimize the surface non-uniformity due to crease wrinkling, coat mottling, and the like. Further, the liquid crystal display of the present invention enables minimized generation of display unevenness. Haze can also be reduced according to the invention.

Disclosed embodiment can be varied by a skilled person without departing from the spirit and scope of the invention.

What is claimed is:

1. A film for a liquid crystal display comprising cellulose ester film containing fine particles,
   wherein average diameter of the fine particle is 0.05 µm to 3.0 µm,
   number of the fine particle per 1000 µm² is 5 to 500 in cross-section perpendicular to the cellulose ester film in a region of a depth of not more than 10 µm from surface of the cellulose ester film, and
   the thickness of the cellulose ester film is between 20 and 65 µm.

2. The film for the liquid crystal display of claim 1, wherein the average diameter of the fine particle is 0.05 µm to 2.0 µm.

3. The film for the liquid crystal display of claim 1, wherein the fine particle are secondary particles.

4. The film for the liquid crystal display of claim 1, wherein the film comprises foreign mater particles at size of 5 m to 50 µm and the number of the foreign matter particles is no more than 200 per 200 m².

5. The film for the liquid crystal display of claim 4, wherein the number of the foreign matter particles having a size of at least 50 µm is substantially zero.

6. The film for the liquid crystal display of claim 1, wherein the film is obtained in the manner that after filtering a dope composition, the dope composition and an addition composition are blended.

7. The film for the liquid crystal display of claim 1, wherein the film is dried by tenter method.

8. The film for the liquid crystal display of claim 1, wherein the film is dried at the range of drying temperature of 40 to 150° C.

9. The film for the liquid crystal display of claim 1, wherein the film is peeled from a support at a residual solvent amount of 60 to 150 percent.

10. The film for the liquid crystal display of claim 1, wherein the film further comprises UV absorber.

11. The film for the liquid crystal display of claim 10, wherein the amount of UV absorber is between 0.1 and 2.5 percent by weight with respect to the cellulose ester.

12. The film for a liquid crystal display of claim 1, wherein an amount of the fine particles in the film is 0.04 to 0.3 percent by weight with respect to cellulose ester.

13. The film for a liquid crystal display of claim 1, wherein the cellulose ester film further comprises fine particles having average particle diameter of 3 to 5 µm.

14. The film for a liquid crystal display of claim 1, wherein haze of the cellulose ester film is 0.0 to 0.6 percent, and dynamic friction coefficient of both a front surface and a back surface of the cellulose ester film is 0.5 to 1.3.

15. The film for a liquid crystal display of claim 1, wherein the fine particles comprise a compound containing silicon atom.

16. The film for a liquid crystal display of claim 1, wherein the cellulose ester film is subjected to knurling treatment of both edges so that X is to be between 0.0 and 25.0 percent wherein X (percent)=(a/d)×100 is maintained, wherein "a" (µm) is the height of the knurling and "d" (µm) is the thickness of said film.

17. The film for a liquid crystal display of claim 1, wherein the film is a protective film of polarizing plate.

18. The film for a liquid crystal display of claim 1, wherein A/B is 1 or more, wherein A is a number of fine particles per 1,000 µm² in the cross-section perpendicular to the cellulose ester film in the region having a thickness of 10 percent of the thickness from each surface of the cellulose ester film, and B is a number of fine particles per 1,000 µm² in the region having a remaining thickness of 80 percent of the thickness.

19. The film for a liquid crystal display of claim 1, wherein number of the fine particles per 1,000 $\mu m^2$ is 0 to 5 in the cross-section perpendicular to the cellulose ester film in the region of a depth of 10 $\mu m$ or more from surface of the cellulose ester film.

20. The film for a liquid crystal display of claim 1, wherein number of projections having a size of at least 0.1 $\mu m$, which exist on the surface of the cellulose ester film, is between 10 and 500 per 1,000 $\mu m^2$.

21. The film for a liquid crystal display of claim 1, wherein true specific gravity of the fine particles is between 0.8 and 4.0.

22. The film for a liquid crystal display of claim 1, wherein the fine particles are selected from the group consisting of silicon dioxide, titanium dioxide, aluminum oxide, zirconium oxide, and tin oxide.

* * * * *